US011019765B2

(12) United States Patent
Gervais et al.

(10) Patent No.: US 11,019,765 B2
(45) Date of Patent: *Jun. 1, 2021

(54) DOUBLE-SHOOT KNIFE ATTACHMENT

(71) Applicant: CNH Industrial Canada, Ltd., Saskatoon (CA)

(72) Inventors: Joel John Octave Gervais, Saskatoon (CA); Guillaume Cloutier Boily, Martensville (CA); Martin J. Roberge, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 169 days.

This patent is subject to a terminal disclaimer.

(21) Appl. No.: 16/105,054

(22) Filed: Aug. 20, 2018

(65) Prior Publication Data

US 2018/0352721 A1    Dec. 13, 2018

Related U.S. Application Data

(62) Division of application No. 15/091,445, filed on Apr. 5, 2016, now Pat. No. 10,064,324.

(51) Int. Cl.
*A01C 5/06*  (2006.01)
(52) U.S. Cl.
CPC ................... *A01C 5/064* (2013.01)
(58) Field of Classification Search
CPC ........... A01C 5/064; A01C 5/062; A01C 5/06; A01C 5/00
See application file for complete search history.

(56) References Cited

U.S. PATENT DOCUMENTS

| | | |
|---|---|---|
| 4,044,697 A | 8/1977 | Swanson |
| 4,466,364 A | 8/1984 | Hassenfritz |
| 4,596,199 A | 6/1986 | Dietrich, Sr. et al. |
| 4,601,248 A | 7/1986 | Beasley |
| 4,607,580 A | 8/1986 | Monty, Jr. |
| 4,896,424 A * | 1/1990 | Walker ............... B26B 1/044 30/161 |
| 5,161,472 A | 11/1992 | Handy |
| 5,495,814 A | 3/1996 | Primus |
| 6,347,594 B1 | 2/2002 | Wending et al. |
| 7,004,090 B2 | 2/2006 | Swanson |

(Continued)

OTHER PUBLICATIONS

Miller Sellner, Case IH No-Till Single-Disk Opener With Knife, Jan. 2, 2016, p. 2, In 1-2: "No-Till Single-Disk Opener with Knife for sale at Miller Sellner" and p. 3, In 1-2: "Features". Retrieved from: http://www.millersellner.com/new-products/case-ih/loaders-and-attachments/Planter-Attachments/No-Till-Single-Disk-Opener-with-Knife.

(Continued)

*Primary Examiner* — Christopher J. Novosad
(74) *Attorney, Agent, or Firm* — Rebecca L. Henkel; Rickard K. DeMille

(57) ABSTRACT

A disc-opener implement for use with an agricultural implement includes a disc configured to form a trench in a surface of a field and a scraper adjacent to the disc. The disc-opener implement also includes a knife that is configured to form a furrow next to or into a sidewall of the trench, wherein the knife comprises a leading edge, and a portion of the leading edge is aligned with a trailing edge of the scraper along a lateral axis of the disc-opener implement.

9 Claims, 10 Drawing Sheets

(56) References Cited

U.S. PATENT DOCUMENTS

| | | |
|---|---|---|
| 7,055,619 B2 | 6/2006 | Linnebur |
| 7,152,539 B2 | 12/2006 | Swanson |
| 7,159,523 B2 | 1/2007 | Bourgault et al. |
| 7,213,524 B2 | 5/2007 | Summach et al. |
| 7,412,933 B2 | 8/2008 | Bourgault et al. |
| 7,540,246 B2 | 6/2009 | Friesen et al. |
| 7,568,438 B2 | 8/2009 | Arksey |
| 8,215,247 B2 | 7/2012 | Schilling et al. |
| 8,646,395 B2 | 2/2014 | Schilling et al. |
| 10,064,324 B2 * | 9/2018 | Gervais .................. A01C 5/064 |
| 2012/0167809 A1 | 7/2012 | Bassett |
| 2015/0319915 A1 | 11/2015 | Pfitzner |

OTHER PUBLICATIONS

White Planters, White Planter Options and Attachments, "Single Disc Fertilizer Opener/Trailing Knife Liquid or Granular Fertilizer Application", 2013, p. 1 col. 1, In 1-6; and "Single Disc Fertilizer Opener/Side Knife Liquid or Granular Fertilizer Application", p. 1 col. 2, In 1-6. Retrieved from: http://www.white-planters.com/9000-seriesplanters/white-planters-options-and-attachments.html.

\* cited by examiner

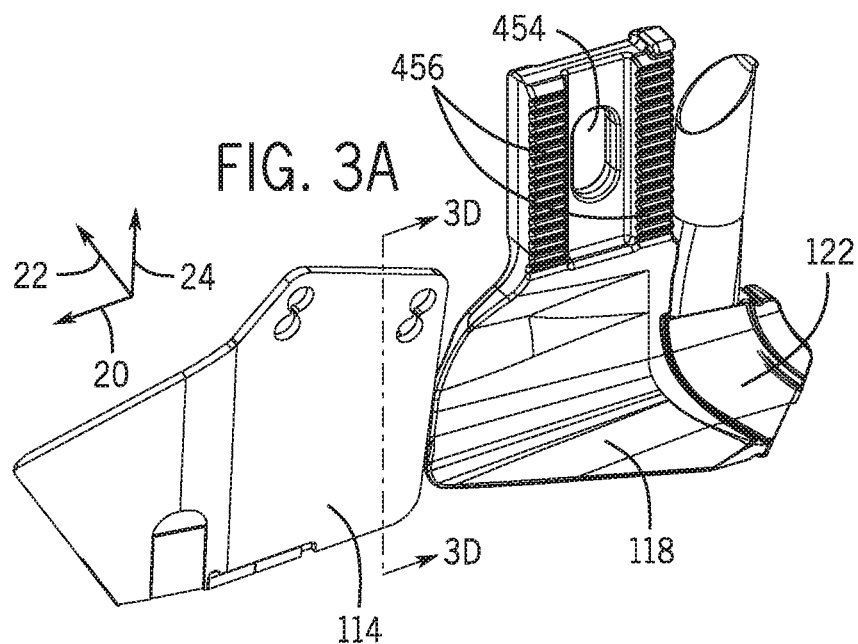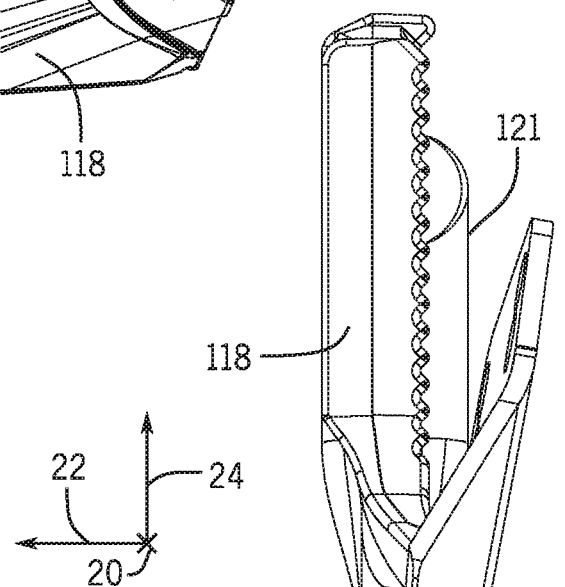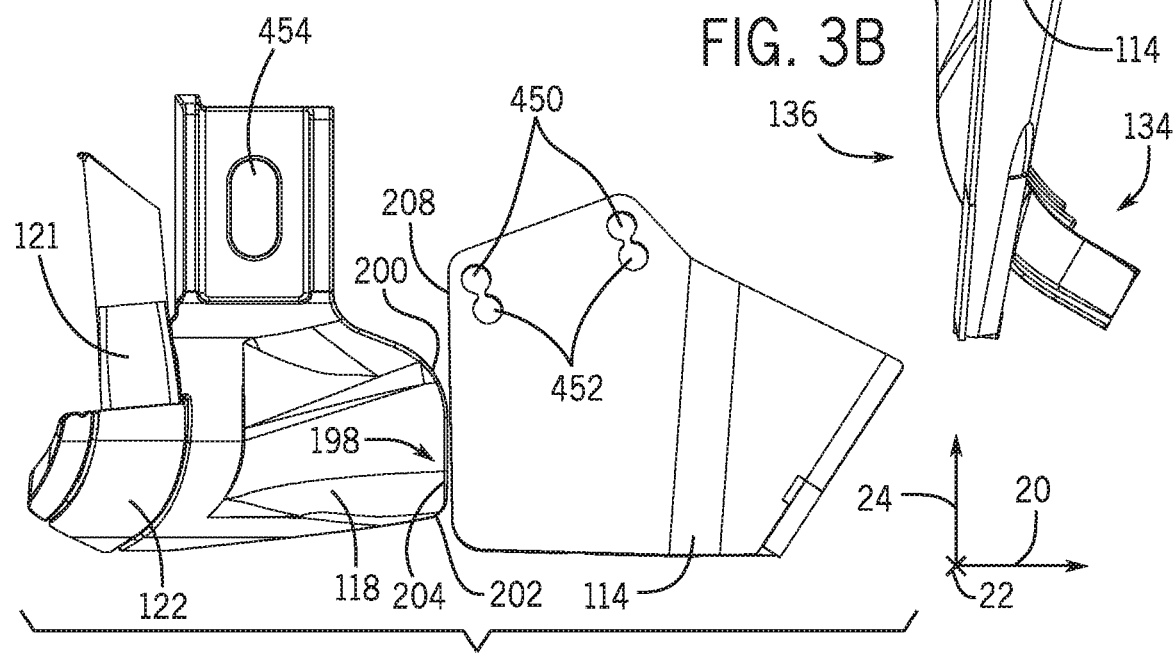

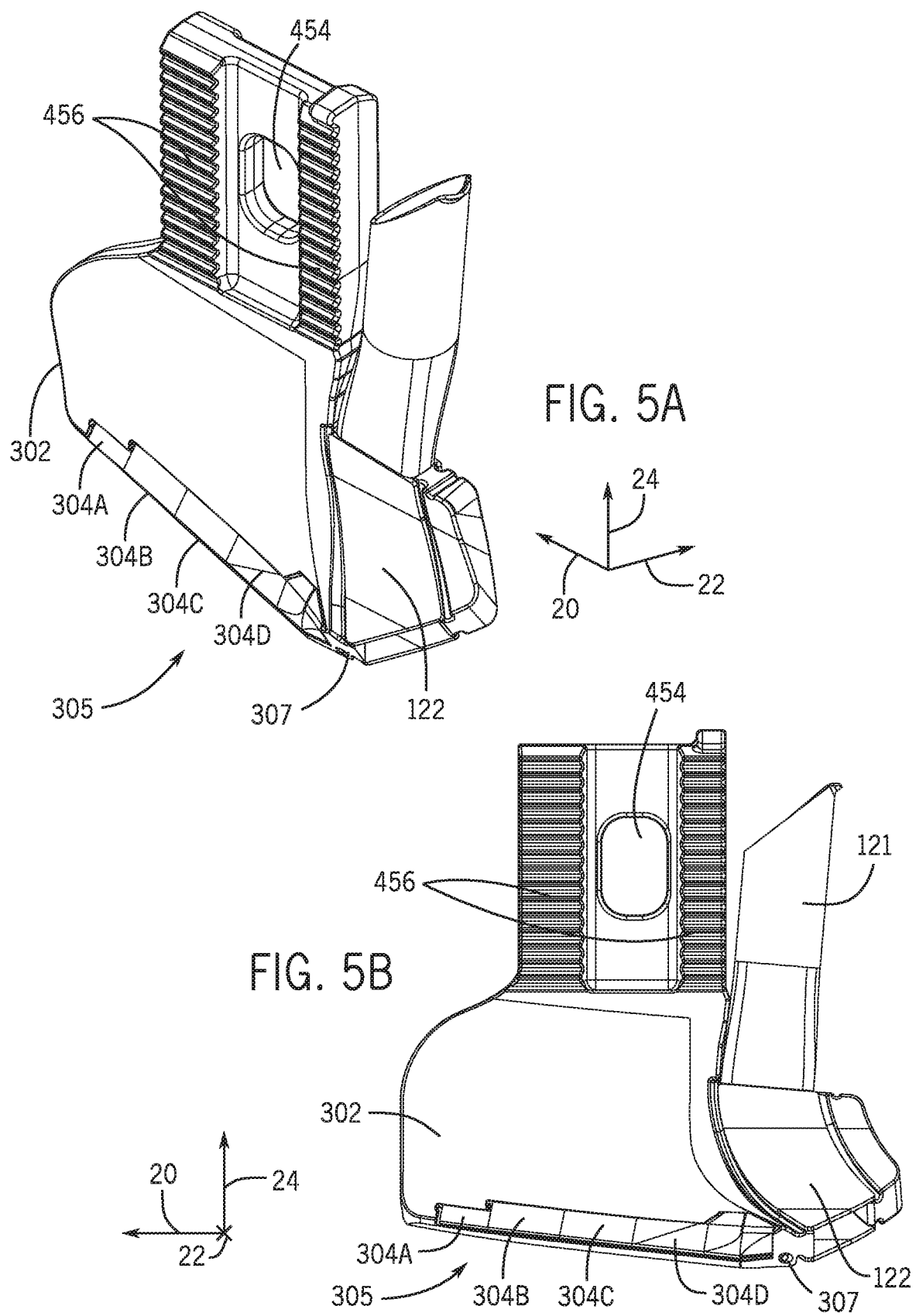

DOUBLE-SHOOT KNIFE ATTACHMENT

CROSS-REFERENCE TO RELATED APPLICATION

This application is a divisional of U.S. patent application Ser. No. 15/091,445 filed on Apr. 5, 2016, which is incorporated by reference herein in its entirety for all purposes.

BACKGROUND

The invention relates generally to agricultural implements, and more specifically to double-shoot disc openers for placement of seeds and/or fertilizer in the soil.

Certain agricultural implements may include disc-opener implements that are configured to generate trenches for seed or fertilizer placement as the agricultural implement is towed through a field. Disc-opener implements may include chutes to deliver seeds and/or fertilizers immediately after trenches are opened, in a single pass. In some applications, the disc-opener implement may include a packing wheel to pack the soil following the placement of the products.

In some applications, separation between seed and fertilizer may be desired. This is usually the case when the direct contact between seed and fertilizer may reduce the yield of a crop. In such situations, the disc-opener implement may include a disc to generate a trench and a tool to open a furrow separated from the trench. A first chute (e.g., a seed or fertilizer tube) may deposit a product in the trench, and a second chute may deposit a product in the furrow. The construction of the disc-opener implement may affect the trench and furrow formation, which can impact overall yield. Accordingly, it would be desirable to improve construction of the disc-opener implement.

BRIEF DESCRIPTION

In one embodiment, a disc-opener implement for use with an agricultural implement includes a disc configured to form a trench in a surface of a field and a scraper adjacent to the disc. The disc-opener implement also includes a knife that is configured to form a furrow next to or into a sidewall of the trench, wherein the knife comprises a leading edge, and a portion of the leading edge is aligned with a trailing edge of the scraper along a lateral axis of the disc-opener implement.

In one embodiment, a disc-opener implement for use with an agricultural implement includes a disc configured to form a trench in a surface of a field and a scraper adjacent to the disc. The scraper is configured to deflect soil away from the disc and includes a trailing edge. The disc-opener implement also includes a knife configured to form a furrow next to or into a sidewall of the trench, and the knife includes an overlapping lip structure formed in a leading edge of the knife, wherein the overlapping lip structure overlaps the scraper along an axial axis of the disc-opener implement and is configured to block lateral movement of the scraper.

In one embodiment, an agricultural system includes a structural frame, a plurality of double-shoot disc-opener implements, each including a disc configured to open a trench. Each disc-opener implement also includes a scraper positioned adjacent to the disc and comprising a trailing edge and a knife configured to open a furrow adjacent to the trench. The knife includes a leading edge having a generally vertically extending portion that overlaps the trailing edge of the scraper along a lateral axis of the disc-opener implement.

DRAWINGS

These and other features, aspects, and advantages of the present invention will become better understood when the following detailed description is read with reference to the accompanying drawings in which like characters represent like parts throughout the drawings, wherein:

FIG. 3A is a perspective view of a scraper and a knife that may be used in a disc-opener implement, in accordance with an embodiment;

FIG. 3B is a front view of the scraper and the knife of FIG. 3A, in accordance with an embodiment;

FIG. 3C is a side view of the scraper and the knife of FIG. 3A, in accordance with an embodiment;

FIG. 5A is a perspective view of a knife having carbide sections placed in a cutting edge, in accordance with an embodiment;

FIG. 5B is a side view of the knife of FIG. 5A, in accordance with an embodiment;

DETAILED DESCRIPTION

The present application is generally directed to a disc-opener implement capable of forming cavities, such as trenches and furrows, in a surface of a field. The implement may include a disc configured to open a primary trench and a scraper that redirects the displaced soil away from the disc-opener implement. The disc-opener implement may also include a knife configured to form a second furrow separated from the primary trench. In some embodiments, the disc-opener implement may include a product chute configured to place products in the formed cavities.

The disposition of the knife may block undesired accumulation of soil redirected by the scraper in certain regions of the disc-opener implement. For example, an alignment between a leading edge of the knife and a trailing edge of the scraper along a lateral axis of the disc-opener implement may block the accumulation of soil between the scraper and the knife. In some implementations, the alignment may be maintained via a mechanical structure, such as a spacer. In other implementations, the alignment may be maintained by a mechanical structure that provides direct contact between the knife and the scraper, such as an overlapping lip formed in the leading edge of the knife. In some implementations, the knife may be provided with erosion-resistant sections (e.g., carbide sections, strips, or coating). The present application also generally relates to an agricultural system that employs multiple disc-opener implements configured to open multiple columns of trenches and furrows, simultaneously. The agricultural system may include disc-opener implements including a disc-opener, a scraper, and a knife.

Figure 1:
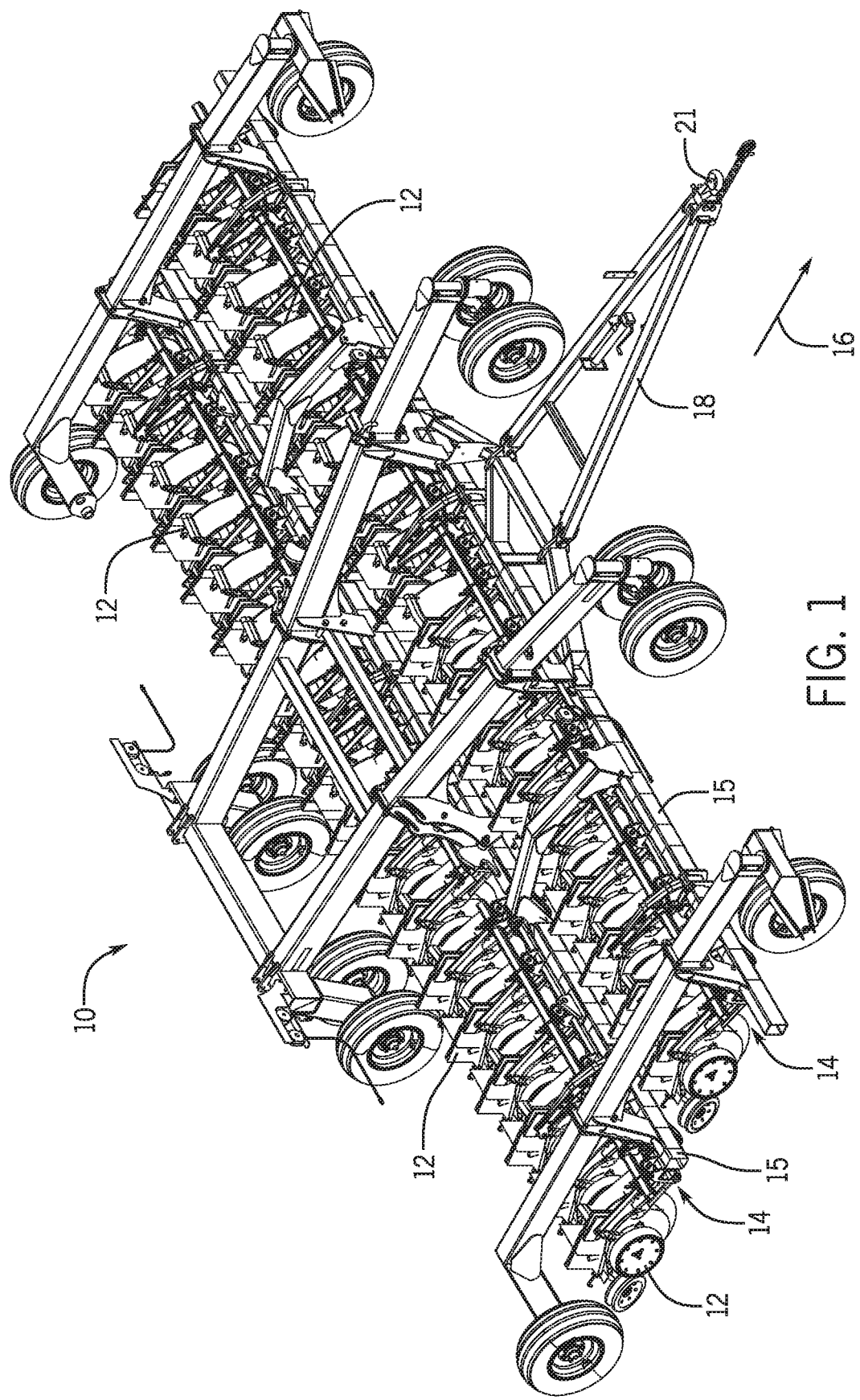
FIG. 1 is a perspective view of an agricultural implement configured to tow multiple disc-opener implements having a knife, in accordance with an embodiment.

Referring now to the drawings, FIG. 1 is a perspective view of a towable agricultural implement 10, including multiple disc-opener implements 12. As discussed in detail below, each disc-opener implement 12 includes a disc (e.g., coulter) configured to form a first trench in the soil, and a knife configured to form a second trench within the first trench. A product delivery assembly positioned behind the disc is configured to inject one or more products (e.g., seed, fertilizer, etc) into the trenches. As illustrated, linkage assemblies 14 secure the disc opener implements 12 to a tool bar 15. In the present embodiment, each tool bar 15 includes 36 disc-opener implements 12. Further embodiments may include more or fewer disc-opener implements 12. For example, certain embodiments may include 30, 36, 40, 48, 60, 64, 72, 80, 96, or more disc-opener implements 12 per tool bar 15. The tool bars 15 are coupled to a tow bar 18, including a hitch 21. The hitch 21 may, in turn, be coupled to a tractor or air cart such that the towable agricultural implement 10 may be pulled through a field in a direction of travel 16.

Figure 2A:
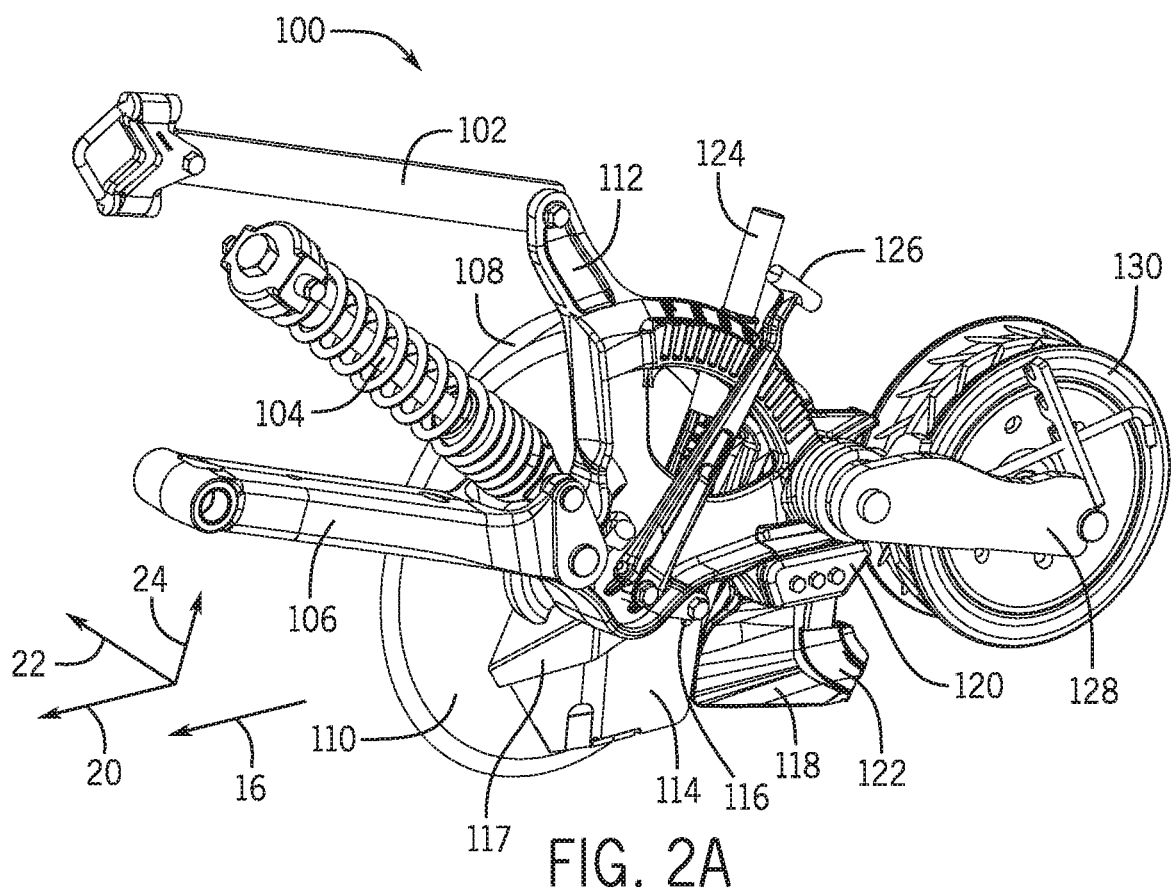
FIG. 2A is a perspective view of a disc-opener implement with a knife, in accordance with an embodiment.
Figure 2B:
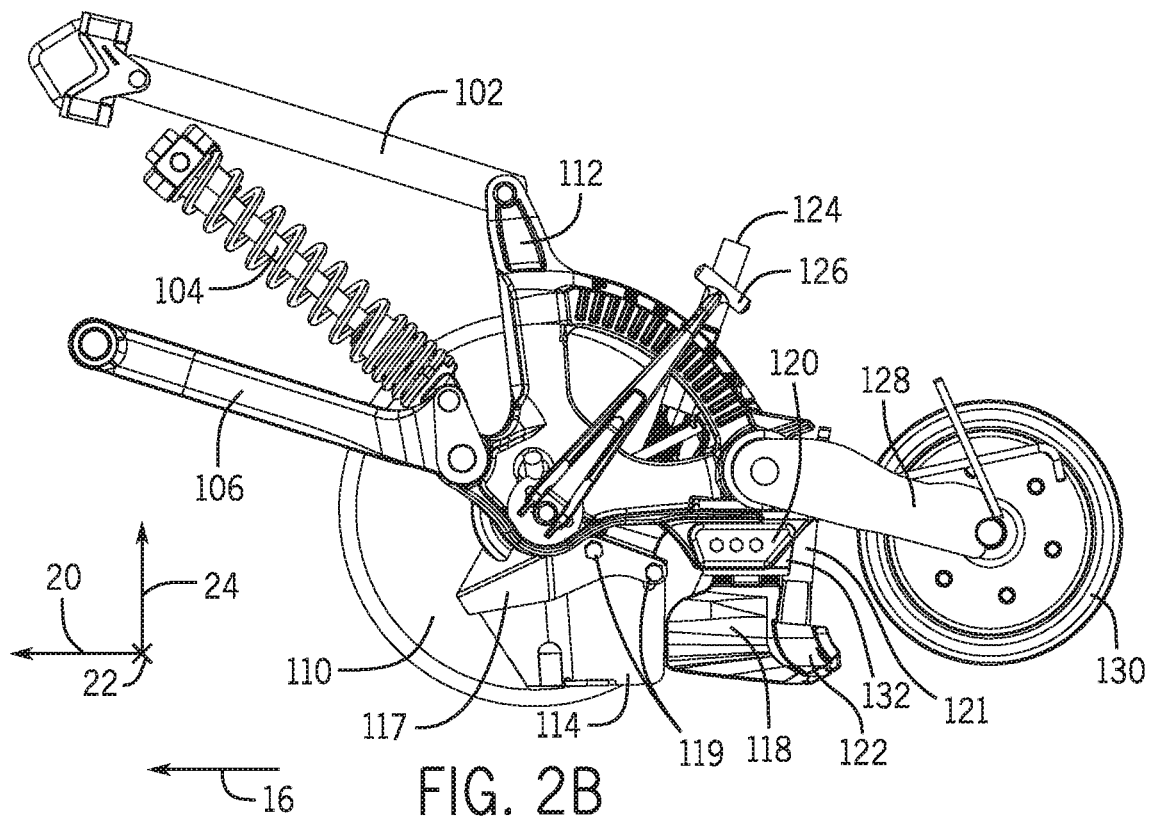
FIG. 2B is a side view of the disc-opener implement of FIG. 2A, in accordance with an embodiment.

FIG. 2A and FIG. 2B show an example of a disc-opener implement 100 in a perspective and a side view, respectively. The disc-opener implement 100 may be described with reference to an axial axis or direction, 20, a lateral axis 22 or direction, and a vertical axis 24 or direction. A frame 112 of the disc-opener implement 100 is attached to a towing system through linkages 102 and 106 and a shock absorber 104 (e.g., biasing member). The disc-opener implement 100 may be provided with a wheel 108 and a disc-opener 110. As the disc-opener implement 100 is dragged in the direction of travel 16, the disc-opener 110 may produce a trench in the soil. A depth regulator handle 126 may be employed to adjust the depth of the disc-opener 110 relative to the wheel 108, which may determine the depth of the opened trench. A product (e.g., fertilizer) may be placed in the trench opened by the disc-opener 110 via a primary chute 124.

The soil displaced by the disc-opener implement 100 may be redirected by a scraper 114, which is attached to the frame 112 with a mount 116 (e.g., support structure) via fasteners 119 (e.g., bolts), in the illustrated embodiment. A residue blocker 117 may block the soil and debris displaced by the implement. As shown, the disc-opener implement 100 includes a knife 118 (e.g., knife attachment), which is configured to produce a second trench (e.g., furrow) in the soil, and which may be removably coupled to the frame 112 with an adaptor 120 (e.g., mount or support structure) and/or a spacer 132 (e.g., mount or support structure). The disc-opener implement 100 may have a secondary chute 121 that places a product (e.g., seed) in the furrow opened by the knife 118 through an outlet 122. To pack the soil after the placement of product(s) in the opened trench, a packing wheel 130 may be connected to frame 112 using link 128.

Figure 3D:
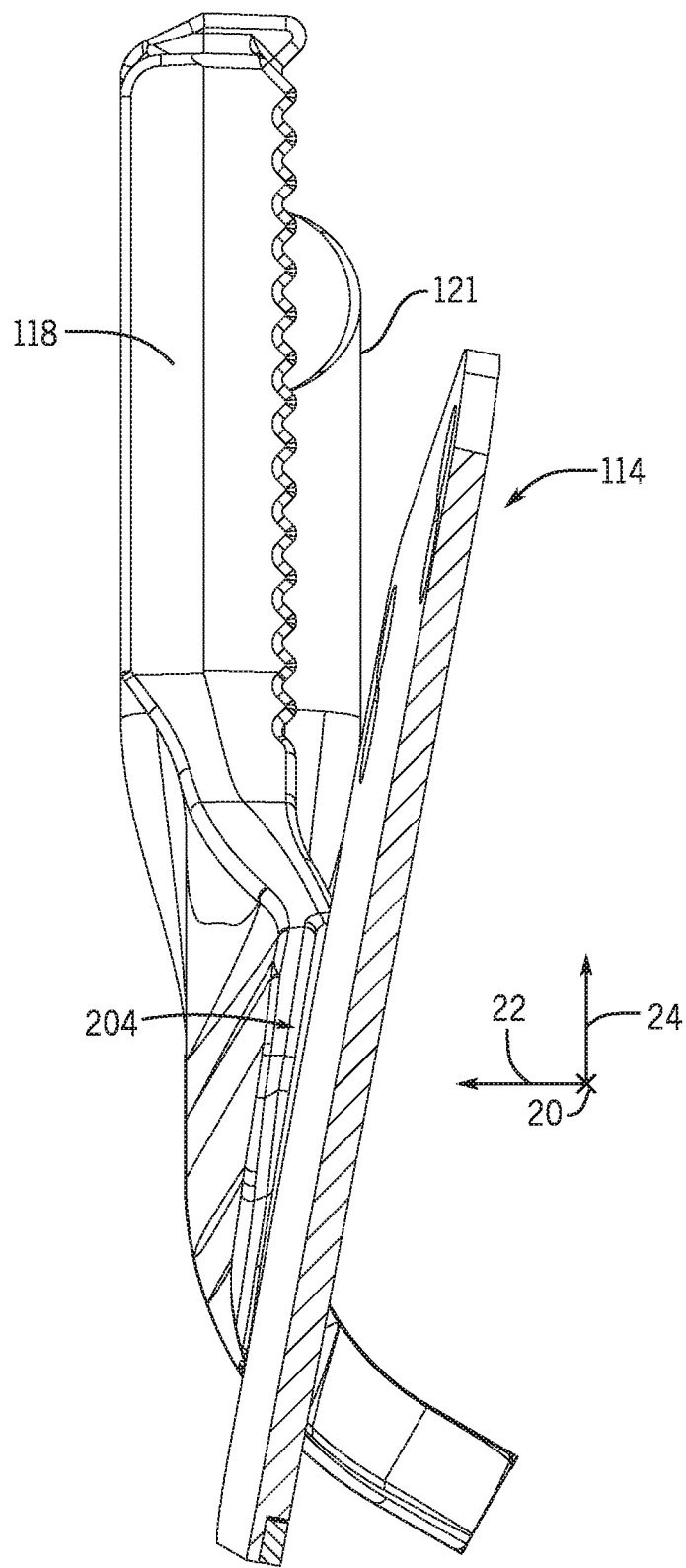
FIG. 3D is a cross-sectional front view of the scraper and the knife taken in line 3D-3D of FIG. 3A, in accordance with an embodiment.

As noted above, the scraper 114 is configured to redirect the flow of soil away from the disc-opener 110. Due to the configuration of the disc-opener implement 100, the scraper 114 may direct the soil toward the knife 118. FIGS. 3A-D illustrate a relative disposition between the scraper 114 and the knife 118. Referring particularly to FIG. 3B, as the disc-opener implement 100 is dragged, soil may be directed toward a first side 134 (e.g., first lateral side or right side) of the scraper 114. However, in some situations, the soil may be directed toward a second side 136 (e.g., second lateral side or left side of the scraper 114.

To block accumulation of soil in parts of the disc-opener implement 100, which may lead to plugging or other undesired effects, care with the relative disposition between the scraper 114 and the knife 118 may be beneficial. In particular, alignment between the knife 118 and the scraper 114 may block accumulation of soil between the scraper 114 and the knife 118. In some implementations, the knife 118 may be very close to contacting the scraper 114 (e.g., separated by less than or by approximately 0.1, 0.2, 0.3, 0.4, 0.5, 1, 2, 3, 4 or 5 centimeters along the axial axis 20, or between approximately 0.1-3, 0.1-2, or 0.1-1 cm along the axial axis 20), as illustrated in FIGS. 3A-D.

In certain embodiments, the knife 118 and the scraper 114 overlap along the lateral axis 22. As shown in FIG. 3C, the knife 118 includes a leading edge 198. The leading edge 198 includes a first curve 200 (e.g., upper curve), a second curve 202 (e.g., lower curve), and a generally vertically extending portion 204 extending between the curves 200, 202. The scraper 114 includes a trailing edge 208. In certain embodiments, the generally vertically extending portion 204 overlaps and/or is aligned with the trailing edge 208 of the scraper 114 along the lateral axis 22, as best shown in FIG. 3D. In some embodiments, the generally vertically extending portion 204 may overlap and/or be aligned with the trailing edge 208 along an entire length of the generally vertically extending portion 204 (i.e., the entire length between curves 200, 202). In some embodiments, the generally vertically extending portion 204 may overlap and/or be aligned with the trailing edge 208 along greater than or approximately 50, 60, 70, 80, 90, or 95 percent of the entire length of the generally vertically extending portion 204.

Figure 4A:
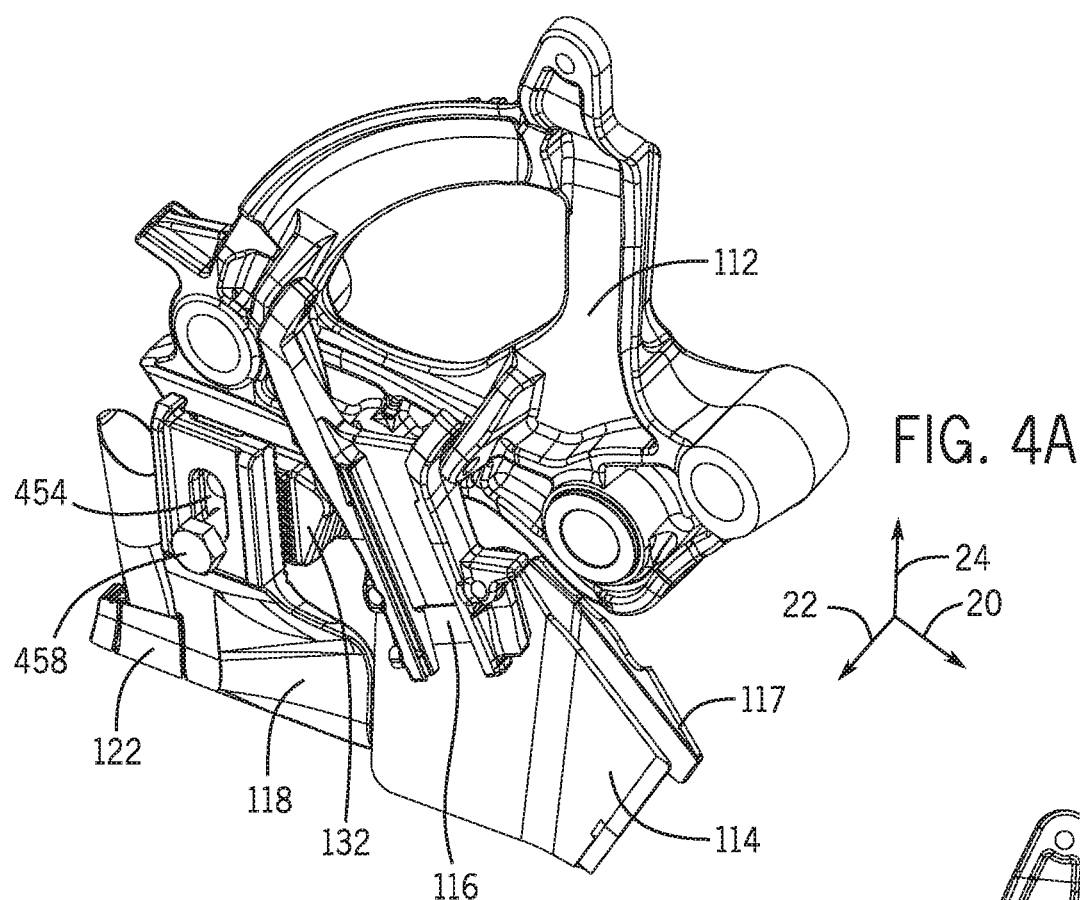
FIG. 4A is a perspective view of a frame and a spacer structure that provides an alignment between a scraper and a knife of a disc-opener implement, in accordance with an embodiment.
Figure 4B:
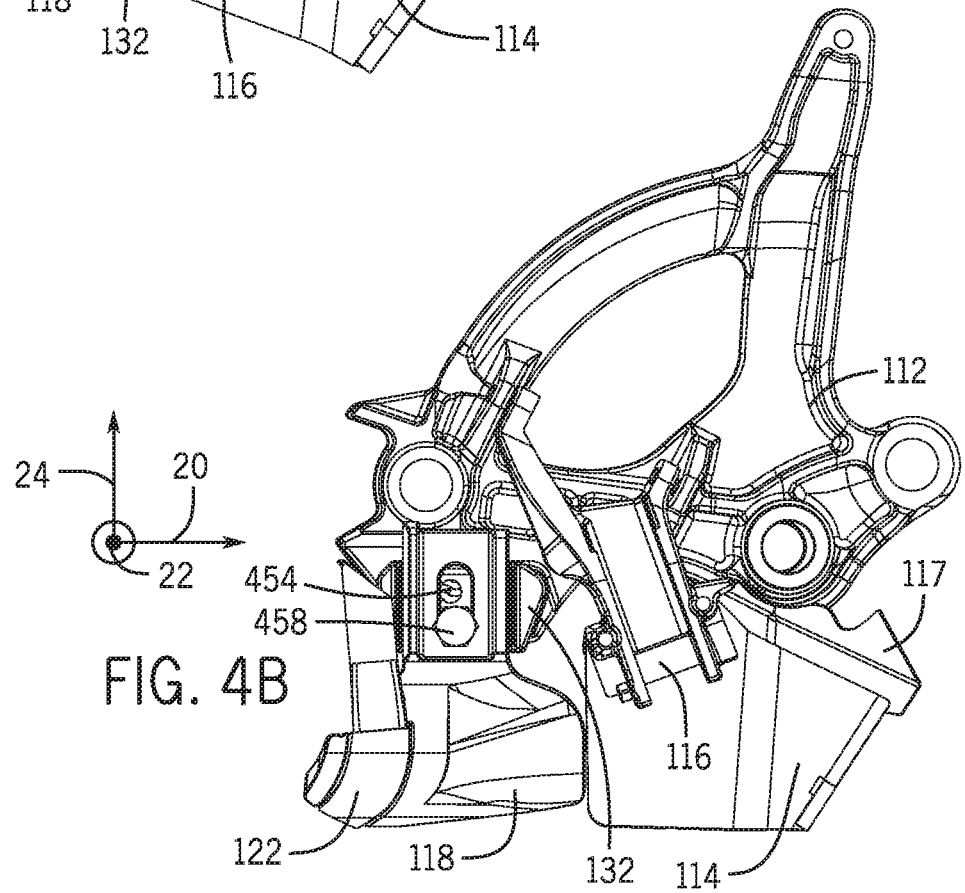
FIG. 4B is a side view of the frame and the spacer structure of FIG. 4A, in accordance with an embodiment.
Figure 6A:
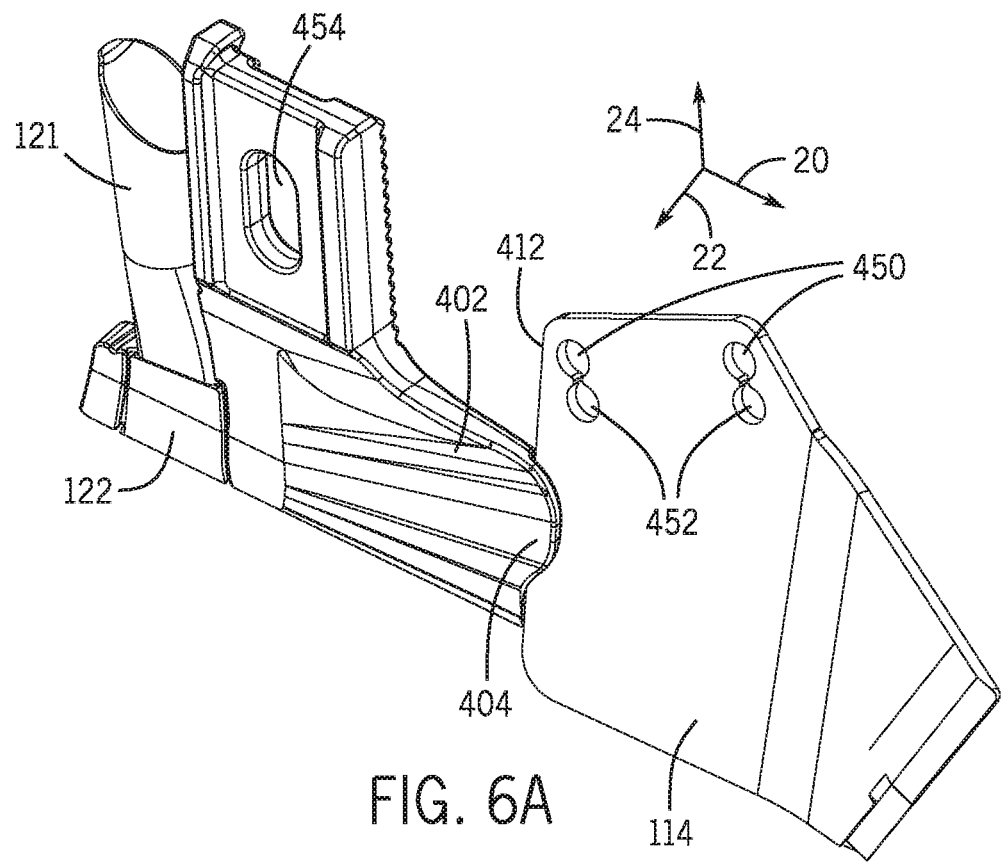
FIG. 6A is a perspective view of a knife with an overlapping lip that provides an alignment between a scraper and the knife, in accordance with an embodiment.
Figure 6B:
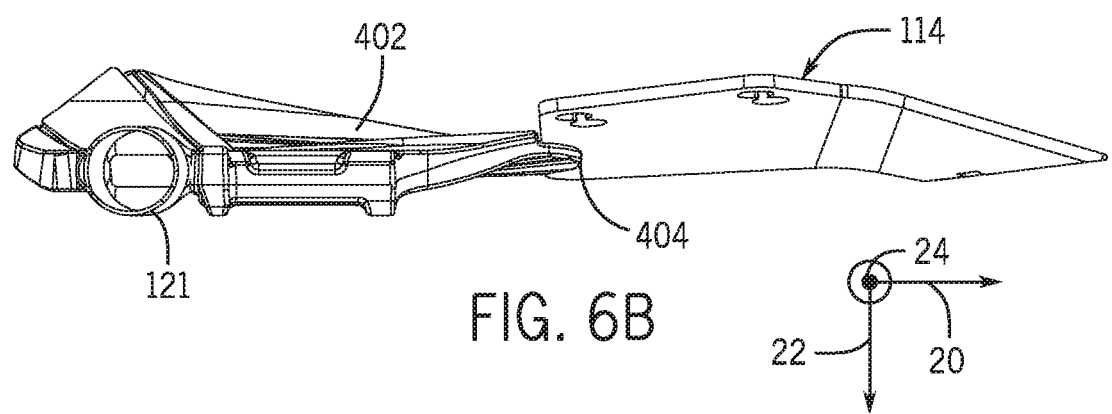
FIG. 6B is a top view of the knife of FIG. 6A, in accordance with an embodiment.
Figure 6C:
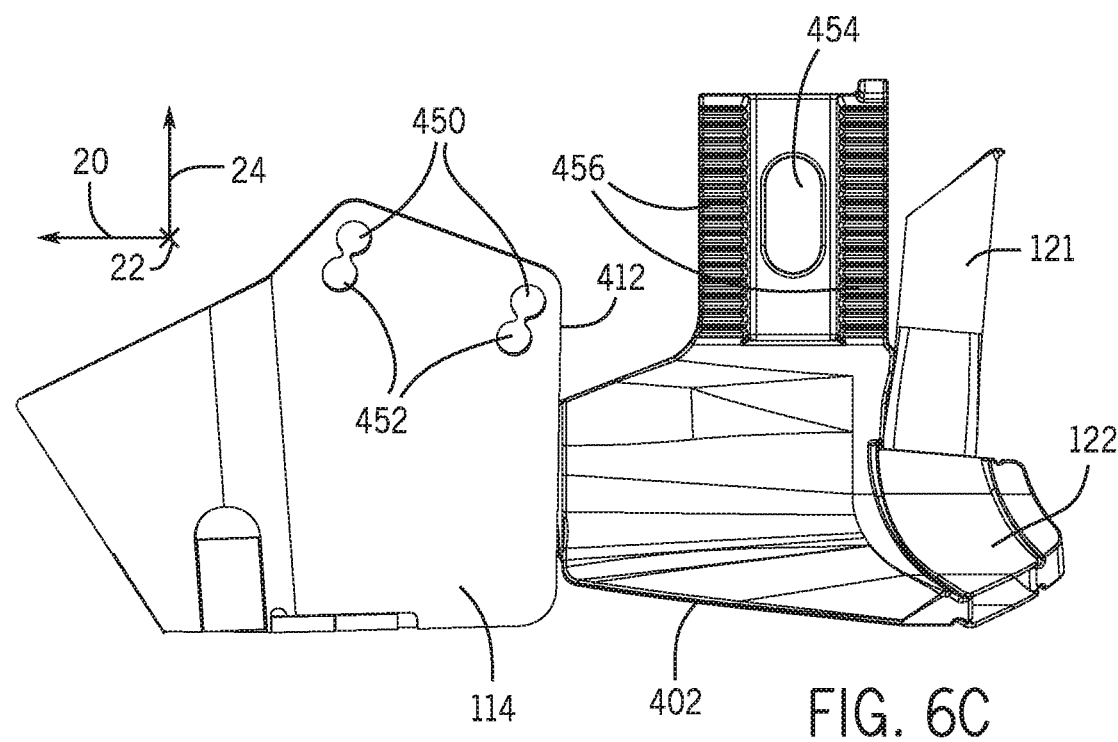
FIG. 6C is a side view of a the knife of FIG. 6A, in accordance with an embodiment.
Figure 6D:
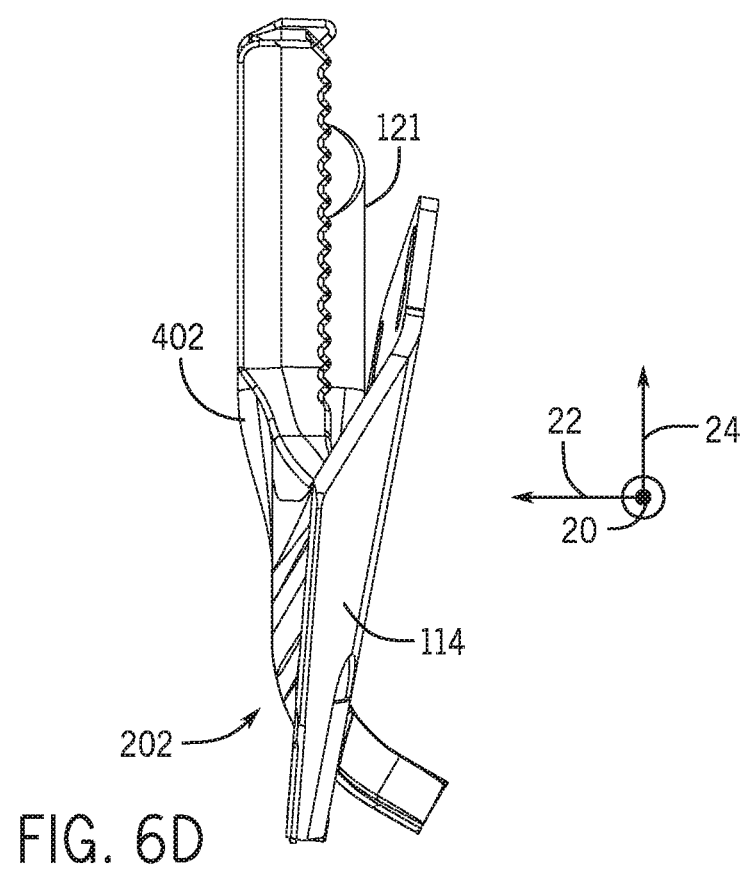
FIG. 6D is a front view of the knife of FIG. 6A, in accordance with an embodiment.

FIG. 4A and FIG. 4B illustrate a structure that is configured to establish and maintain the desired alignment between the scraper 114 and the knife 118 discussed above. The spacer element 132 may be coupled to the frame 112 and the knife 118, and may be dimensioned to provide a desired alignment between the frame 112 and the knife 118. Since the scraper 114 is also mounted to the frame 112, the spacer element 132 also establishes the alignment between scraper 114 and knife 118 discussed above with respect to FIGS. 3A-D.

In certain embodiments, a position of the scraper 114 relative to the frame 112 and/or the disc 110 along the vertical axis 24 may be adjusted. Such a configuration may advantageously maintain a desired vertical position of the scraper 114 relative to the disc 110 (e.g., a portion of the disc 110 extends vertically below the scraper 114), which in turn causes the disc 110 to continue to cut the soil to form the first trench and blocks or prevents the scraper 114 from directly cutting the soil to form the first trench. Such a configuration may also advantageously enable adjustment of the position of the scraper 114 as a diameter of the disc 110 decreases over time due to normal wear. As shown in FIGS. 2B and 3C, for example, the scraper 114 may be coupled to the mount 116 at a first position (e.g., lower position along the vertical axis 24 and/or rearward position along the axial axis 22) via fasteners 119 (e.g., bolts) extending through first mount holes 450. The scraper 114 may be coupled to the mount 116 at a second position (e.g., higher position along the vertical axis 24 and/or forward position along the axial axis 22) via the fasteners 119 extending through mount holes 452. Although the illustrated scraper 114 is configured to move to two different positions, it should be understood that any suitable number (e.g., 1, 2, 3, 4, 5, or more) of mount holes may be provided. In certain embodiments, the knife 118 may be moved prior to or during movement of the scraper 114. For example, the knife 118 may be moved along the axial axis 22 and/or along the vertical axis 24 by adjusting the relative location of a fastener 458 (e.g., bolt) within a hole 454. In certain embodiments, the knife 118 may include grooves 456 that are configured to mate with corresponding grooves of the spacer 132. The grooves 456 enable movement of the knife 118 along the axial axis 22 relative to the spacer 132, the frame 112, and/or the scraper 114. In certain embodiments, the grooves 456 may enable such movement, while supporting or maintaining the knife 118 in a particular vertical position. Thus, the disclosed embodiments may enable the scraper 114 and the knife 118 to be moved relative to the disc 110, the frame 112, and/or to one another, thereby enabling the scraper 114 and the knife 118 to maintain the alignment and/or positions disclosed herein.

FIG. 5A and FIG. 5B illustrate an example of a knife 302 having erosion-resistant sections 304A-D (e.g., erosion-resistant strips or coating formed of carbide or other suitable material) along a cutting edge 305. The sections 304A-D may provide additional structural support, and may extend the lifetime of the knife 302. In some implementations, the sections 304A-D may also improve the capacity of the knife 302 to create the secondary furrow. In certain embodiments, a cavity 307 may be configured to receive or may include an additional wear resistant material. For example, an erosion-resistant material, such as carbide, may be placed within the cavity 307, thereby protecting the bottom surface of the knife 302 and/or a portion (e.g., a corner) of the outlet 122 of the secondary chute 121. In some embodiments, the cavity 307 may extend laterally and/or axially through a portion of the knife 118 that is positioned axially between the cutting edge 305 (e.g., sections 304A-D of the cutting edge 305) and the outlet 122 of the secondary chute 121.

Figure 7:
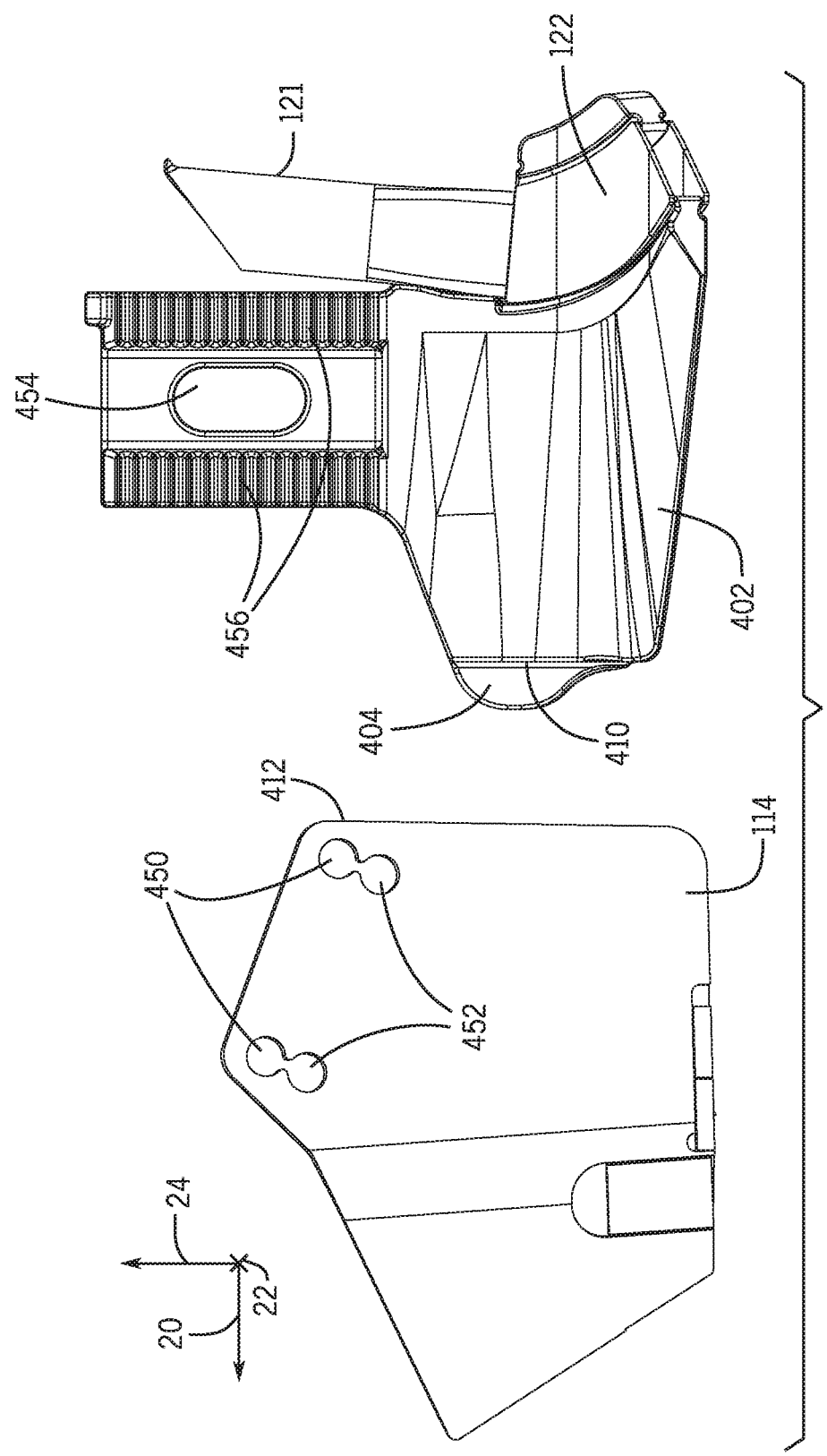
FIG. 7 is an exploded side view of a knife with an overlapping lip that provides an alignment between a scraper and the knife, in accordance with an embodiment.

FIGS. 6A-D illustrate an example of a knife 402 with an overlapping lip 404. As discussed above, alignment of the knife 402 and the scraper 114 may be helpful in reducing an undesired accumulation of soil in the disc-opener implement 100. The overlapping lip 404 facilitates such alignment by providing a structure that may block or limit relative movement (e.g., along the lateral axis 22) between the scraper 114 and the knife 402. For example, as the disc-opener implement 100 is dragged through a field, the scraper 114 may be driven laterally via contact with the soil or other debris. The overlapping lip 404 provides a bracing structure (e.g., blocking structure) for the scraper 114 to block lateral movement of the scraper 114. A comparison between the side view in FIG. 6C and the exploded side view in FIG. 7 illustrates the region of the overlapping lip 404 that may come in contact with the scraper 114 during operation of the implement to block the relative movement between the scraper 114 and the knife 402. As shown, the overlapping lip 404 is formed along a leading edge 410 of the knife 402 and extends beyond (e.g., overlaps) a trailing edge 412 of the scraper along the axial axis 20.

Figure 8:
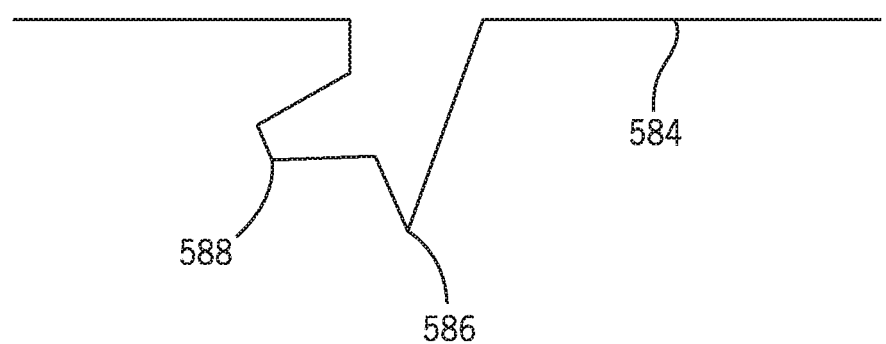
FIG. 8 is a schematic diagram of a trench that may be formed in a surface of a field by a disc-opener implement, in accordance with an embodiment.

FIG. 8 provides a schematic diagram of a surface 584 of a field and a trench 586 that may be formed by the disc 110 of the disc-opener implements 110 disclosed herein, in accordance with an embodiment. The diagram also illustrates the furrow 588 that may be formed the knife, such as the knife 118, 302, or 402.

While only certain features of the invention have been illustrated and described herein, many modifications and changes will occur to those skilled in the art. It is, therefore, to be understood that the appended claims are intended to cover all such modifications and changes as fall within the true spirit of the invention. Furthermore, it should be understood that any of the features illustrated and described herein with respect to FIGS. 1-8 may be combined in any suitable manner.

The invention claimed is:

1. An agricultural system, comprising:
a structural frame;
a plurality of double-shoot disc-opener implements, wherein at least one double-shoot disc-opener implement comprises:
a disc configured to form a trench in a surface of a field;
a scraper adjacent to the disc, wherein the scraper is configured to deflect soil away from the disc and comprises a trailing edge; and
a knife disposed behind the scraper, configured to form a furrow next to or into a sidewall of the trench, wherein the knife includes an overlapping lip structure formed in a leading edge of the knife, and the overlapping lip structure overlaps the scraper along an axial axis of the at least one double-shoot disc-opener implement and is configured to block lateral movement of the scraper;
wherein the overlapping lip structure is configured to block substantial accumulation of soil between the knife and the scraper; and
wherein the leading edge of the knife extends beyond the trailing edge of the scraper along an axial axis of the at least one disc-opener implement.

2. The agricultural system of claim 1, wherein the at least one disc-opener implement comprises a first product chute configured to place a first product in the trench.

3. The agricultural system of claim 2, wherein the at least one disc-opener implement comprises a second product chute configured to place a second product in the furrow.

4. The agricultural system of claim 1, wherein the knife comprises carbide sections in a cutting edge.

5. The agricultural system of claim 1, wherein the knife is detachable.

6. An agricultural system comprising:
a structural frame; and
at least one disc-opener implement, comprising:
a disc configured to form a trench in a surface of a field;
a scraper adjacent to the disc and comprising a trailing edge; and
a knife disposed behind the scraper and comprising a leading edge that is vertically positioned to form a furrow next to or into a sidewall of the trench, wherein a portion of the leading edge is aligned with the trailing edge of the scraper along a lateral axis of the at least one disc-opener implement; and
wherein the at least one disc-opener implement comprises an overlapping lip structure formed in the leading edge of the knife and the overlapping lip structure contacts the scraper and extends beyond the trailing edge of the scraper along an axial axis of the at least one disc-opener implement.

7. The agricultural system of claim 6, wherein the at least one disc-opener implement comprises a spacer configured to support the knife at a fixed position relative to the disc.

8. The agricultural system of claim 7, wherein the fixed position is configured to block formation of substantial soil accumulation in a region between the knife and the scraper.

9. The agricultural system of claim 6, wherein the at least one disc-opener implement comprises:
  a first product chute configured to place a first product in the trench; and
  a second product chute configured to place a second product in the furrow.

* * * * *